United States Patent
Takaki

(10) Patent No.: US 10,909,850 B2
(45) Date of Patent: Feb. 2, 2021

(54) MOVEMENT TRACK DETECTION APPARATUS, MOVING OBJECT DETECTION APPARATUS, AND MOVEMENT TRACK DETECTION METHOD

(71) Applicant: DENSO CORPORATION, Kariya (JP)

(72) Inventor: Ryo Takaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/086,786

(22) PCT Filed: Feb. 22, 2017

(86) PCT No.: PCT/JP2017/006662
§ 371 (c)(1),
(2) Date: Sep. 20, 2018

(87) PCT Pub. No.: WO2017/163736
PCT Pub. Date: Sep. 28, 2017

(65) Prior Publication Data
US 2019/0103025 A1    Apr. 4, 2019

(30) Foreign Application Priority Data
Mar. 22, 2016 (JP) .................. 2016-057503

(51) Int. Cl.
*G06F 17/10* (2006.01)
*G08G 1/16* (2006.01)
(Continued)

(52) U.S. Cl.
CPC ............ *G08G 1/16* (2013.01); *B60R 21/00* (2013.01); *B60W 30/09* (2013.01); *G01S 13/931* (2013.01);
(Continued)

(58) Field of Classification Search
CPC combination set(s) only.
See application file for complete search history.

(56) References Cited

U.S. PATENT DOCUMENTS

| 2005/0004762 A1 | 1/2005 | Takahama et al. |
| 2012/0020524 A1* | 1/2012 | Ishikawa ............... H04N 7/183 382/103 |

(Continued)

FOREIGN PATENT DOCUMENTS

| JP | 2005-38407 A | 2/2005 |
| JP | 2008-310585 A | 12/2008 |

(Continued)

*Primary Examiner* — Adam M Alharbi
(74) *Attorney, Agent, or Firm* — Maschoff Brennan

(57) ABSTRACT

An ECU comprises: an acquisition unit configured to acquire two end positions of an object in a lateral direction of an own vehicle in an image captured by a camera sensor; a calculation unit configured to calculate a movement track of the object in the lateral direction of the own vehicle based on at least a center position of the acquired two end positions in the lateral direction of the own vehicle; and a determination unit configured to determine whether or not the acquisition unit has acquired, as the two end positions, both a moving end point whose position changes in the captured image and a fixed end point whose position does not change in the captured image. The calculation unit calculates the movement track based on the moving end point when it is determined that the acquisition unit has acquired the moving end point and the fixed end point.

4 Claims, 10 Drawing Sheets

(51) Int. Cl.
  *B60R 21/00* (2006.01)
  *B60W 30/09* (2012.01)
  *G01S 13/931* (2020.01)
  *G06K 9/00* (2006.01)
  *H04N 7/18* (2006.01)

(52) U.S. Cl.
  CPC ......... *G06K 9/00805* (2013.01); *H04N 7/183* (2013.01); *B60W 2420/42* (2013.01)

(56) References Cited

U.S. PATENT DOCUMENTS

| | | |
|---|---|---|
| 2012/0127017 A1 | 5/2012 | Sasabuchi |
| 2014/0168431 A1 | 6/2014 | Goto et al. |
| 2015/0049195 A1 | 2/2015 | Ishigaki et al. |
| 2016/0101779 A1* | 4/2016 | Katoh ........................ G06T 7/20 340/435 |

FOREIGN PATENT DOCUMENTS

| | | |
|---|---|---|
| JP | 2011-116218 A | 6/2011 |
| JP | 2012-093883 A | 5/2012 |
| JP | 2014-135039 A | 7/2014 |
| JP | 2015-57690 A | 3/2015 |

* cited by examiner

FIG.2
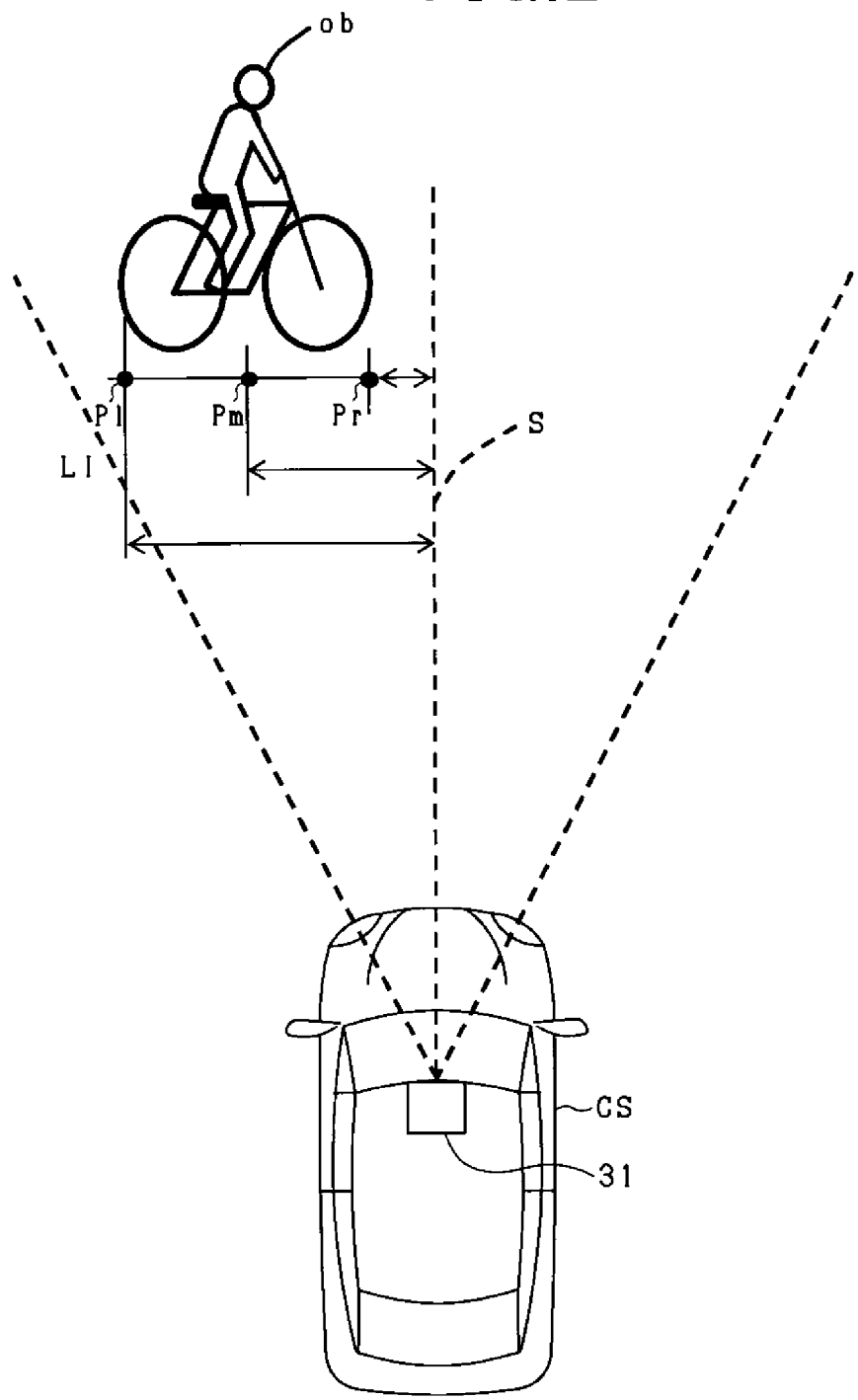
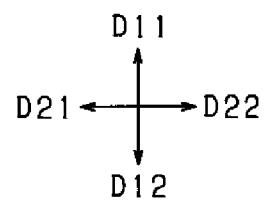

FIG.4
(a)
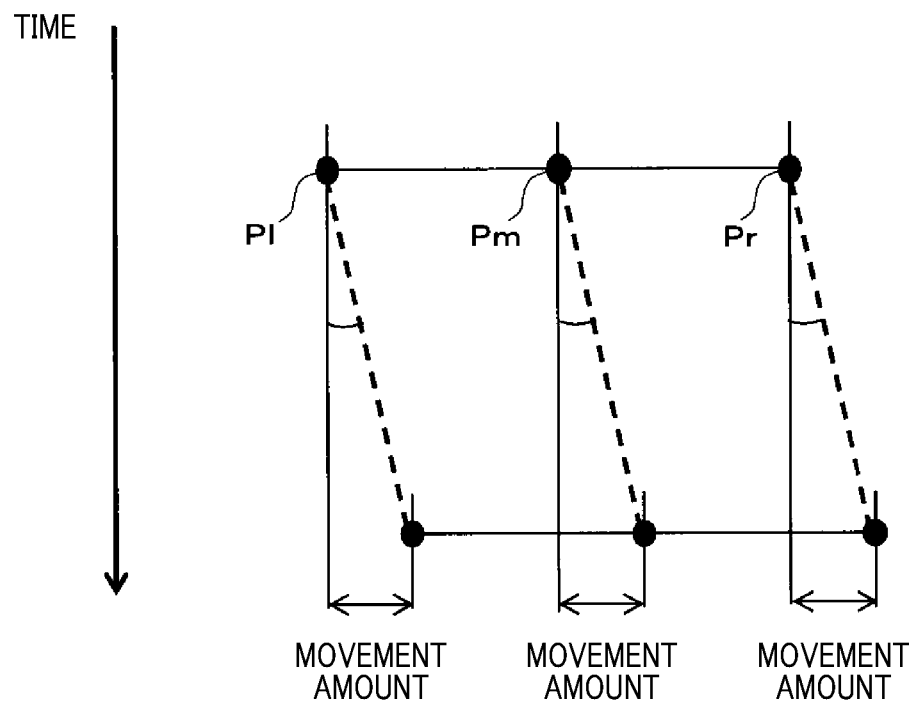
(b)
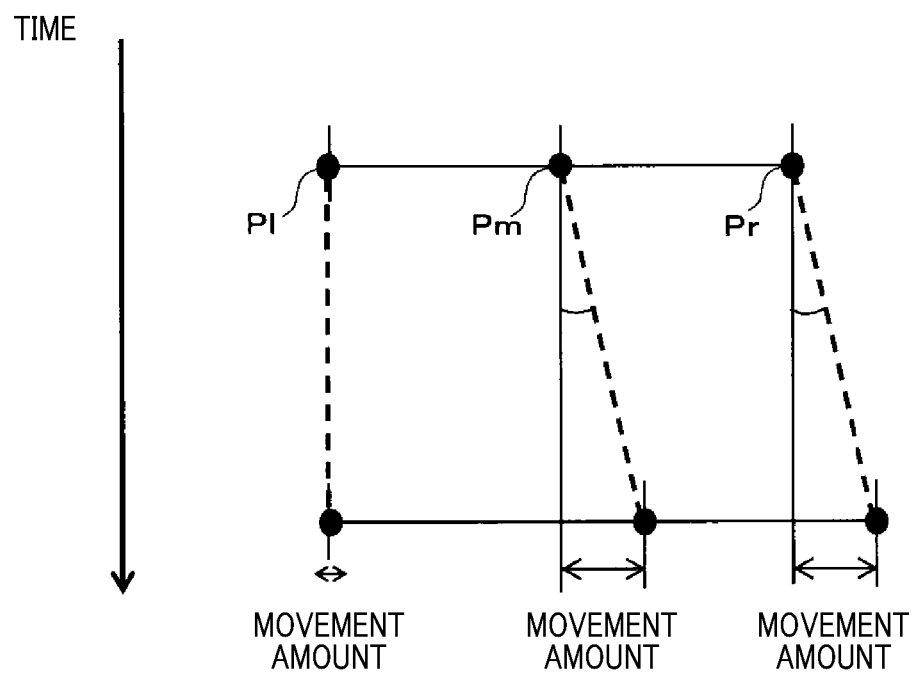
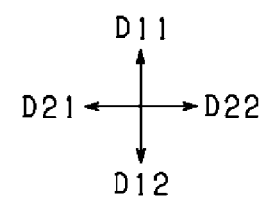

FIG.8
(a)
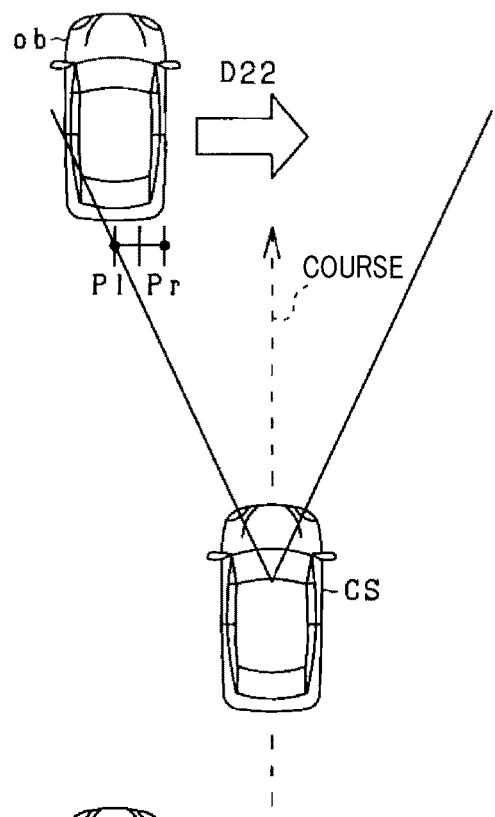
(b)
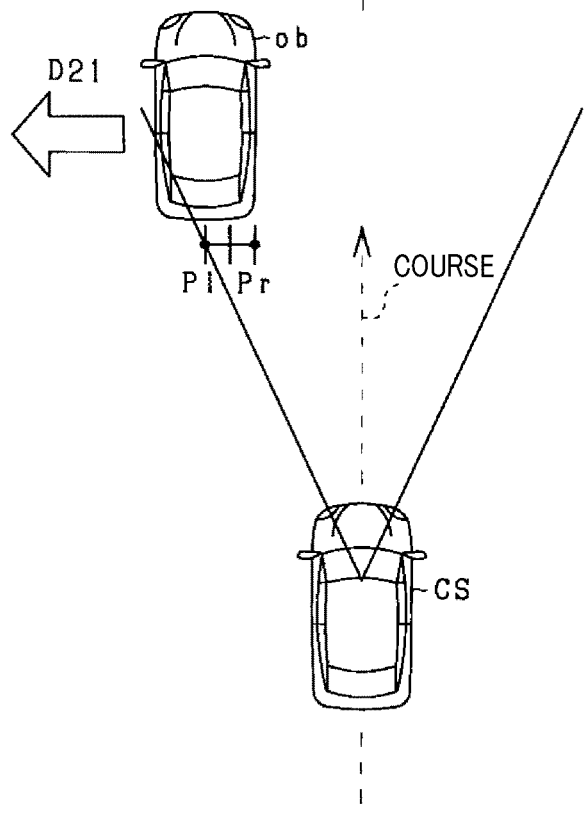
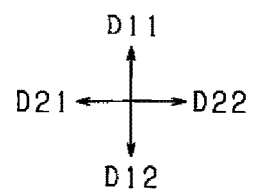

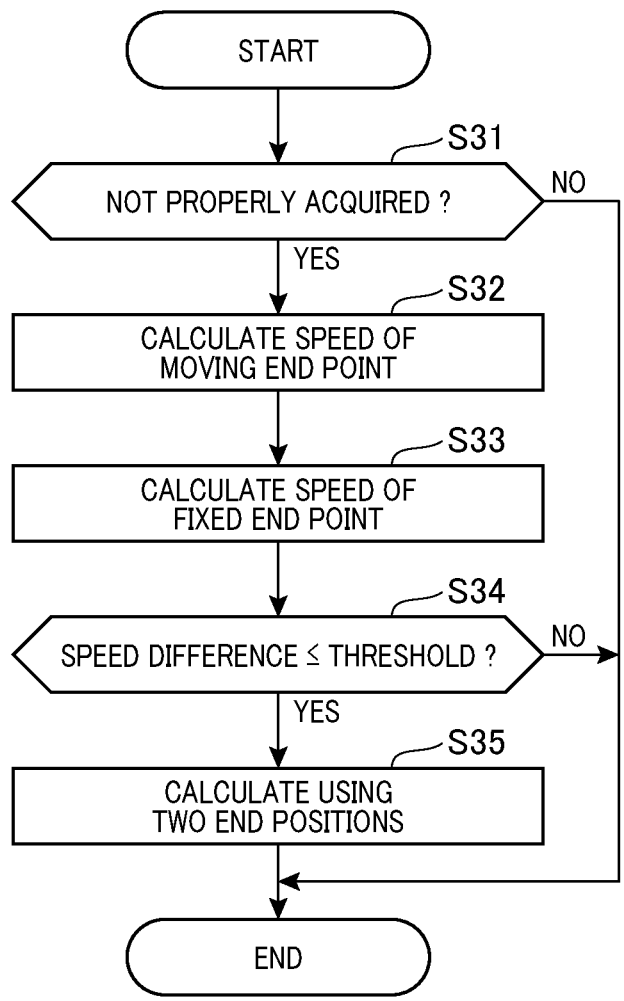

MOVEMENT TRACK DETECTION APPARATUS, MOVING OBJECT DETECTION APPARATUS, AND MOVEMENT TRACK DETECTION METHOD

CROSS REFERENCE TO RELATED APPLICATION

The present application is a national stage application under 35 U.S.C. § 371(c) of PCT Application No. PCT/JP2017/006662, filed on Feb. 22, 2017, which is based on Japanese Patent Application No. 2016-057503 filed on Mar. 22, 2016, the contents of which are incorporated herein by reference.

TECHNICAL FIELD

The present disclosure relates to a movement track detection apparatus for detecting a movement track of an object, a moving object detection apparatus, and a movement track detection method.

BACKGROUND ART

PTL 1 discloses a movement track detection apparatus configured to acquire moving positions of the two end points of an object in the lateral direction of the own vehicle based on a captured image of an area in front of the vehicle and detect a movement track of the object in the lateral direction of the own vehicle based on the acquired moving positions. In addition, the movement track detection apparatus described in PTL 1 applies weights to the moving positions of the object and improves the accuracy of the movement track by changing the weights based on the distance from the position to the own vehicle.

CITATION LIST

Patent Literature

[PTL 1] JP 2008-310585 A

SUMMARY OF THE INVENTION

When a movement position of an object is detected by a monocular camera or the like, the movement position may not be properly acquired. For example, when a part of the object is hidden behind an obstacle or is outside the angle of view of the camera, the movement position cannot be appropriately obtained. Calculation of the movement track by applying weights to all positions including positions that were not properly acquired may cause an error in the calculated movement track.

The present disclosure has been made in view of the above problems, and an object thereof is to provide a movement track detection apparatus, a moving object detection apparatus, and a movement track detection method capable of suppressing an error in the movement track of an object in the lateral direction of the own vehicle even when a movement position of the object is not properly acquired.

In order to solve the above problems, in the present disclosure, a movement track detection apparatus includes: an acquisition unit configured to acquire two end positions of an object in a lateral direction of an own vehicle in an image captured by an image capturing unit; a calculation unit configured to calculate a movement track of the object in the lateral direction of the own vehicle based on at least a center position of the acquired two end positions; and a determination unit configured to determine whether or not the acquisition unit has acquired, as the two end positions, both a moving end point whose position changes in the captured image and a fixed end point whose position does not change in the captured image, wherein the calculation unit calculates the movement track based on the moving end point when it is determined that the acquisition unit has acquired the moving end point and the fixed end point.

According to the disclosure configured as described above, since the movement track is calculated based on at least the center position acquired by the acquisition unit, variation and the like can be suppressed compared with the case where the movement track is calculated based on the end points of the object. On the other hand, on condition that only a part of the object is imaged in the captured image, the movement track is calculated based on the moving end point of the object. Thus, an error in the movement track due to erroneous recognition of the positions can be suppressed. Specifically, when the object is moving and the two end positions of the object have been properly acquired, the two end positions only include moving end points. Thus, when the acquisition unit has acquired a fixed end point and a moving end point as the two end positions, there is a high probability that the two end positions of the object are not properly acquired. Therefore, the determination unit determines whether or not a fixed end point and a movement end point are acquired by the acquisition unit. When it is determined that a fixed end point and a moving end point are obtained as the two end positions by the acquisition unit, the movement track of the object in the own vehicle lateral direction is calculated based on the moving end point.

BRIEF DESCRIPTION OF THE DRAWINGS

The above and other objects, features, and advantages of the present disclosure will become clearer from the following detailed description with reference to the accompanying drawings. In the drawings:

FIG. 2 is a diagram for describing position information of an target Ob detected by a controller;

FIG. 4 is a diagram for describing evaluation of lateral position information LI;

FIG. 8 is a diagram for describing a determination process in step S21;

FIG. 10 is a flowchart illustrating a process according to a fourth embodiment.

DESCRIPTION OF THE EMBODIMENTS

Figure 1:
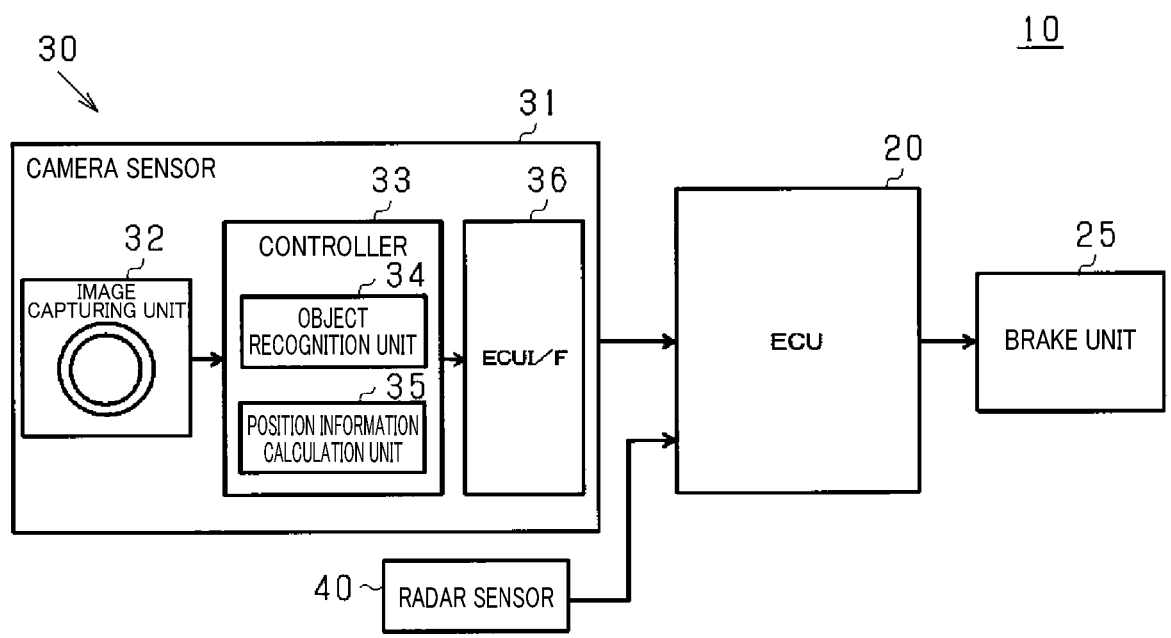
FIG. 1 is a configuration diagram showing a driving support apparatus.

An embodiment of a movement track detection apparatus will be described with reference to the drawings. Hereinafter, the movement track detection apparatus is applied as a part of a driving support apparatus that supports driving of an own vehicle. The same or equivalent parts in the embodiments described below are assigned with the same reference number in the drawings, and an earlier explanation should be referred to regarding those parts having the same reference number as another.

First Embodiment

FIG. 1 is a configuration diagram showing a driving support apparatus 10. For example, the driving support apparatus 10 is provided in a vehicle and monitors movement of an object present ahead of the vehicle. When there is a probability of collision between the object and the vehicle, an operation to avoid or alleviate the collision is carried out by applying automatic braking. Further, as shown in FIG. 1, the driving support apparatus 10 includes various sensors 30, an ECU 20, and a brake unit 25. In the embodiment shown in FIG. 1, the ECU 20 functions as a movement track detection unit.

Hereinafter, the vehicle in which the driving support apparatus 10 is installed is referred to as an own vehicle CS, and the object recognized by the driving support apparatus 10 is described as a target Ob. Further, the traveling direction of the own vehicle CS is denoted by D1, and the direction crossing the traveling direction of the own vehicle CS (the lateral direction of the own vehicle) is denoted by D2. In addition, when the opposite directions in either of the above directions are to be distinguished, they are described as D11 and D12, and D21 and D22, respectively.

The various sensors 30 are connected to the ECU 20, and they output the detection results of the target Ob to the ECU 20. In FIG. 1, the sensors 30 include a camera sensor 31 and a radar sensor 40.

The camera sensor 31 is provided in the front part of the own vehicle CS, and recognizes the target Ob present ahead of the own vehicle. The camera sensor 31 includes an image capturing unit 32 for capturing a captured image, a controller 33 for performing well-known image processing on the captured images acquired by the image capturing unit 32, an ECU IF 36 for enabling communication between the controller 33 and the ECU 20. Therefore, the image capturing unit 32 functions as an image capturing unit.

The image capturing unit 32 includes a lens part serving as an optical system and an image capturing element for converting the light collected through the lens part into an electrical signal. The image capturing element may be a well-known image capturing element such as CCD, CMOS, or the like. The electrical signal converted by the image capturing element is stored in the controller 33 as a captured image through the ECU IF 36.

The controller 33 is configured by a well-known computer including a CPU, a ROM, a RAM, and the like. In addition, the controller 33 functionally includes an object recognition unit 34 which recognizes the target Ob included in the captured image, and a position information calculation unit 35 which calculates position information of the recognized object. The object recognition unit 34 performs well-known edge detection processing on the captured image to recognize the target Ob. The position information calculation unit 35 calculates the relative position of the recognized target Ob relative to the own vehicle CS.

FIG. 2 is a diagram for illustrating position information of the target Ob detected by the controller 33. This position information includes lateral position information LI indicative of each position of the target Ob in the lateral direction D2 of the own vehicle. Further, the lateral position information LI is composed of a left end position Pl, a center position Pm, and a right end position Pr.

The left end position Pl and the right end position Pr are acquired as the two end positions of the target Ob in the own vehicle lateral direction D2. In this embodiment, the left end position Pl is a position indicating the distance from the center S of the angle of view of the camera sensor 31 to the left end of the target Ob as viewed in the lateral direction D2 of the own vehicle. Further, the right end position Pr is a position indicating the distance from the center S of the angle of view of the camera sensor 31 to the right end of the target Ob as viewed in the lateral direction D2 of the own vehicle. The central position Pm is a position indicating the distance from the center S of the angle of view to the central position of the target Ob in the lateral direction D2 of the own vehicle.

The radar sensor 40 is provided in the front part of the own vehicle CS, and it recognizes the target Ob present ahead of the own vehicle and calculates a following distance, a relative speed, and the like with respect to the target Ob. The radar sensor includes a light emitting unit which irradiates a laser beam toward a predetermined area in front of the own vehicle and a light receiving unit which receives reflected waves of the laser beam irradiated in front of the own vehicle, and it is configured to scan a predetermined area in front of the own vehicle at a predetermined cycle. Based on a signal corresponding to the time period from the irradiation of the laser light from the light emitting unit to the reception of the reflected wave at the light receiving unit, and a signal corresponding to an incident angle of the reflected wave, the radar sensor 40 detects the distance between the own vehicle and the target Ob existing ahead of the own vehicle.

The ECU 20 is configured as a well-known computer including a CPU, a ROM, a RAM, and the like. The ECU 20 executes programs stored in the ROM based on detection results of the various sensors 30 and the like in order to carry out a movement track calculation process described later.

The brake unit 25 serves as a brake unit that reduces vehicle speed V of the own vehicle CS. Further, the brake unit 25 performs automatic braking of the own vehicle CS under the control of the ECU 20. The brake unit 25 includes, for example, a master cylinder, a wheel cylinder which applies braking force to the wheels, and an ABS actuator which adjusts the distribution of pressure (for example, hydraulic pressure) from the master cylinder to the wheel cylinders. The ABS actuator is connected to the ECU 20, and the amount of braking of the wheels is adjusted by adjusting the hydraulic pressure from the master cylinder to the wheel cylinders under the control of the ECU 20.

Next, the movement track calculation process for calculating a movement track of the target Ob will be described with reference to FIG. 3. The movement track calculation process is repeatedly performed by the ECU 20 at a predetermined cycle. It is assumed that, in performing the process of FIG. 3, a target Ob has been recognized in the captured image by the camera sensor 31.

In step S11, the lateral position information LI of the target Ob is acquired. The left end position Pl, the right end position Pr, and the center position Pm are obtained from the camera sensor 31 as the lateral position information LI. Step S11 serves as an acquisition unit and an acquisition step.

In step S12, the movement amounts per unit time of the left end position Pl and the right end position Pr included in the lateral position information LI are calculated. For example, every time the process of step S11 is performed, the lateral position information LI is stored, and the respective differences between the left end position Pl and the right end position Pr stored in the current cycle and the left end position Pl and the right end position Pr stored in the previous cycle are calculated as the movement amounts per unit time of the lateral position information LI.

In step S13, it is determined whether or not the lateral position information LI has been properly acquired. Here, if the target Ob is entirely included in the captured image in the own vehicle lateral direction D2, it is determined that the lateral position information LI has been properly acquired. On the other hand, when the target Ob is only partially included in the captured image, it is determined that the lateral position information LI has not been properly acquired. Whether or not the target Ob is entirely included in the captured image is determined based on whether or not the lateral position information LI includes a movement end point and a fixed end point. The movement end point is the point of the left end position Pl or the right end position Pr of which the position with respect to the own vehicle CS changes within the captured image. The fixed end point is the point of the left end position Pl or the right end position Pr of which the position with respect to the own vehicle CS does not change within the captured image. In this embodiment, the point of the left end position Pl and the right end position Pr acquired in step S12 with a movement amount per unit time that is equal to or larger than a threshold is determined as the movement end point, and the point with a movement amount per unit time that is equal to or less than the threshold is determined as the fixed end point. Step S13 serves as a determination unit and a determination step.

FIG. 4 is a diagram for describing the determination in step S13. As shown in FIG. 4(a), if the camera sensor 31 has properly acquired the lateral position information LI of the moving target Ob, the amounts of movement per unit time of the lateral position information LI (Pl, Pm, Pr) become theoretically equal. On the other hand, as shown in FIG. 4(b), when the camera sensor 31 has not properly acquired the lateral position information LI, the amounts of movement per unit time of the positions (Pl, Pm, Pr) will not be equal. For example, in a case where a part of the target Ob is covered with an obstacle or a part of the target Ob is outside the angle of view, and thus the camera sensor 31 detects a position of the target Ob other than its end part as the left end position Pl or the right end position Pr, the movement amount of the erroneously acquired position becomes smaller than the movement amount of a position that has been properly acquired.

Therefore, by comparing the movement amounts per unit time of the left end position Pl and the right end position Pr with the threshold, the point with a movement amount equal to or larger than the threshold is determined as a movement end point, and the point with a movement amount less than the threshold is determined as a fixed end point. In addition, when a monocular camera is used as the camera sensor 31, there is a greater risk of an error in the two end positions of the target Ob. Thus, by using the movement amount per unit time, errors are canceled out, and accuracy in the determination of the lateral position information LI by the ECU 20 can be enhanced.

Returning to FIG. 3, if the two end positions Pl and Pr include only movement end points and the lateral position information LI has been properly acquired (step S13: YES), in step S14, all of the lateral position information LI is used to calculate a movement track of the target Ob. The movement track of the target Ob in step S14 is calculated, for example, by using each of the temporal changes of the left end position Pl, the right end position Pr, and the center position Pm.

On the other hand, if the two end positions Pl and Pr include a movement end point and a fixed end point but the lateral position information LI has not been properly acquired (step S13: NO), in step S15, only the movement end point of the two end points Pl and Pr is used to calculate the movement track of the target Ob. Therefore, the process in step S15 calculates the movement track using one point of the left end position Pl and the right end position Pr that has been determined as the movement end point. Step S14 and step S15 serve as a calculation unit and a calculation step.

Figure 3:
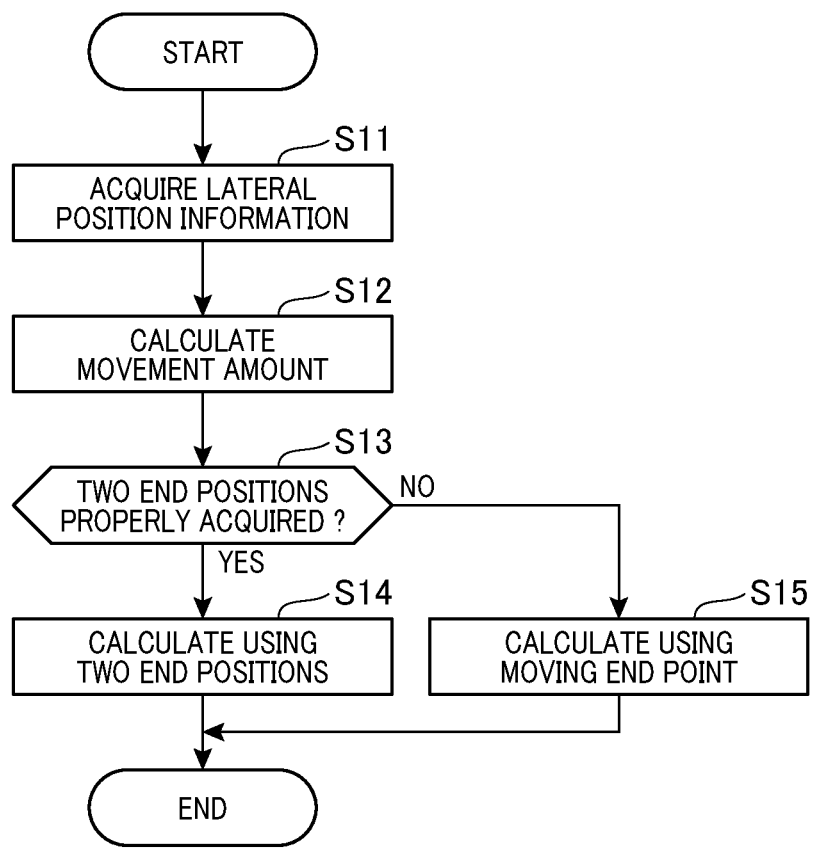
FIG. 3 is a flowchart illustrating a movement track calculation process performed by the driving support apparatus.

After performing the process of step S14 or step S15, the process shown in FIG. 3 halts.

Figure 5:
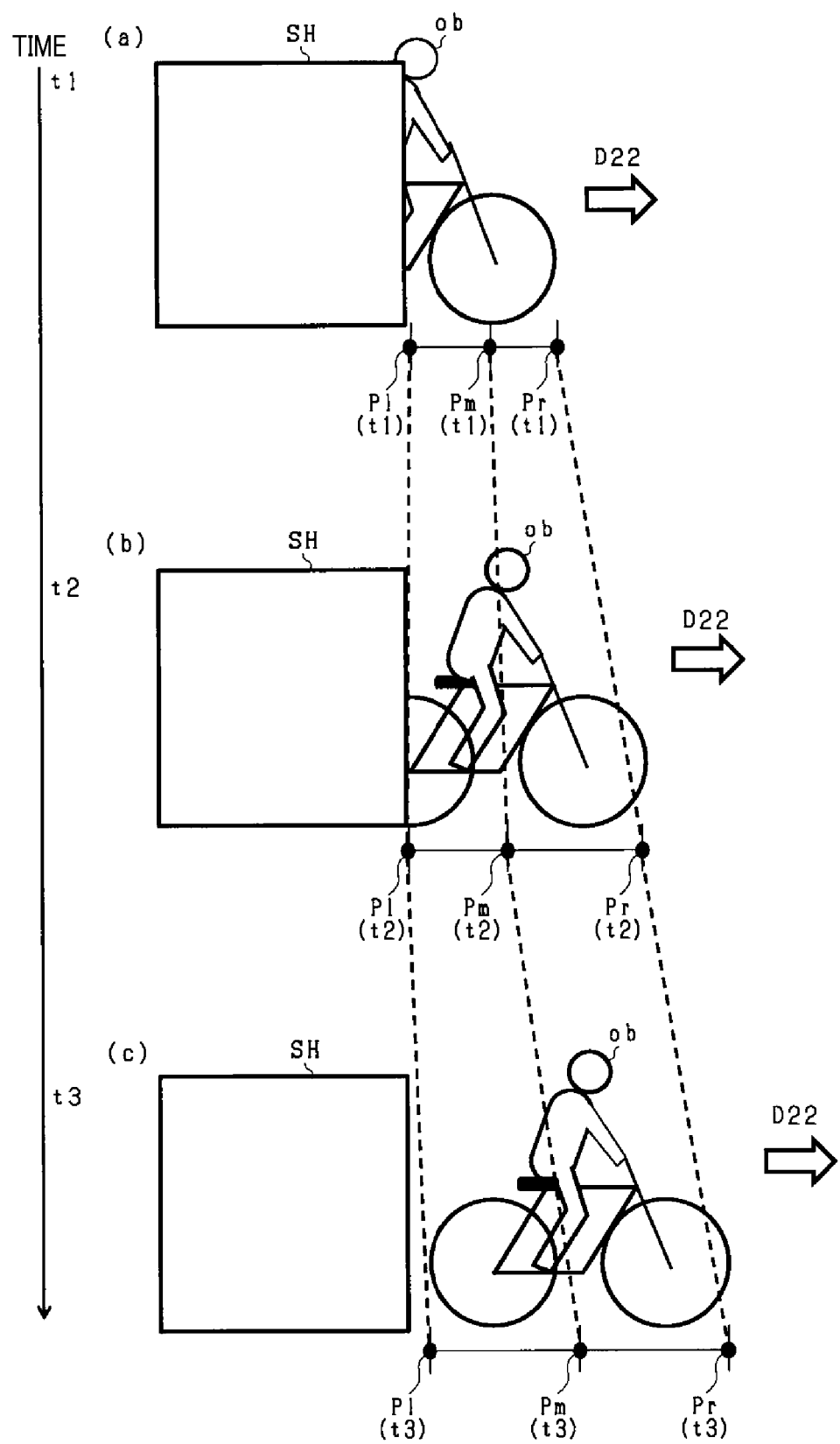
FIG. 5 is a diagram showing, as a comparison, an example of calculating a movement track based on erroneously acquired lateral position information LI.

Next, the movement track of the target Ob detected by the ECU 20 will be described. FIG. 5 is a diagram showing, as a comparison, an example of calculating the movement track based on erroneously acquired lateral position information LI. In FIG. 5, it is assumed that the type of the target Ob is a two-wheeled vehicle such as a bicycle or a motorcycle, and a part of the target Ob is hidden by an obstacle SH. Further, it is assumed that the target Ob is moving in the own vehicle lateral direction D22. Furthermore, in the following description, the lateral position information LI at each time is indicated with (Pl(tn), Pm(tn), Pr(tn)). Note that n is an identifier for identifying each point in time.

When the camera sensor 31 is recognizing the target Ob, the lateral position information LI (Pl, Pm, Pr) is output from the camera sensor 31. As shown in FIG. 5(a), at time t1, since the left side (in the figure) of the target Ob is hidden by the obstacle SH, the left end position Pl of the target Ob will be detected as being located more to the right (in the figure) compared with the actual left end of the target Ob. Thus, the left end position Pl (t1) and the center position Pm (t1) of the lateral position information LI has not been properly acquired.

As shown in FIG. 5(b), at time t2, although the target Ob has moved in the own vehicle lateral direction D22, the left end (in the figure) of the target Ob is still hidden behind the obstacle SH. Thus, the left end position Pl (t2) and the center position Pm (t2) of the lateral position information LI have not been properly acquired. As shown in FIG. 5(c), at time t3, when the target Ob has completely come out from the obstacle SH, and the left end position Pl of the target Ob will be detected as the actual left end of the target Ob.

In the example shown in FIG. 5, since the left end position Pl and the center position Pm of the lateral position information LI of the target Ob are erroneously acquired in the time period from time t1 to time t3, an error is generated in the movement track calculated using the lateral position information LI. Therefore, if the position of the target Ob is to be determined based on the movement track calculated by the ECU 20, the accuracy in the position determination with respect to the target Ob is reduced. In the example of FIG. 5, due to the movement track calculated based on the left end position Pl determined as a fixed end or the center position Pm with an error, the movement position of the target Ob will be determined to be located more to the own vehicle lateral direction D21 side compared with the actual movement position. As a result, the operation accuracy of the brake unit 25 by the ECU 20 may be reduced.

Figure 6:
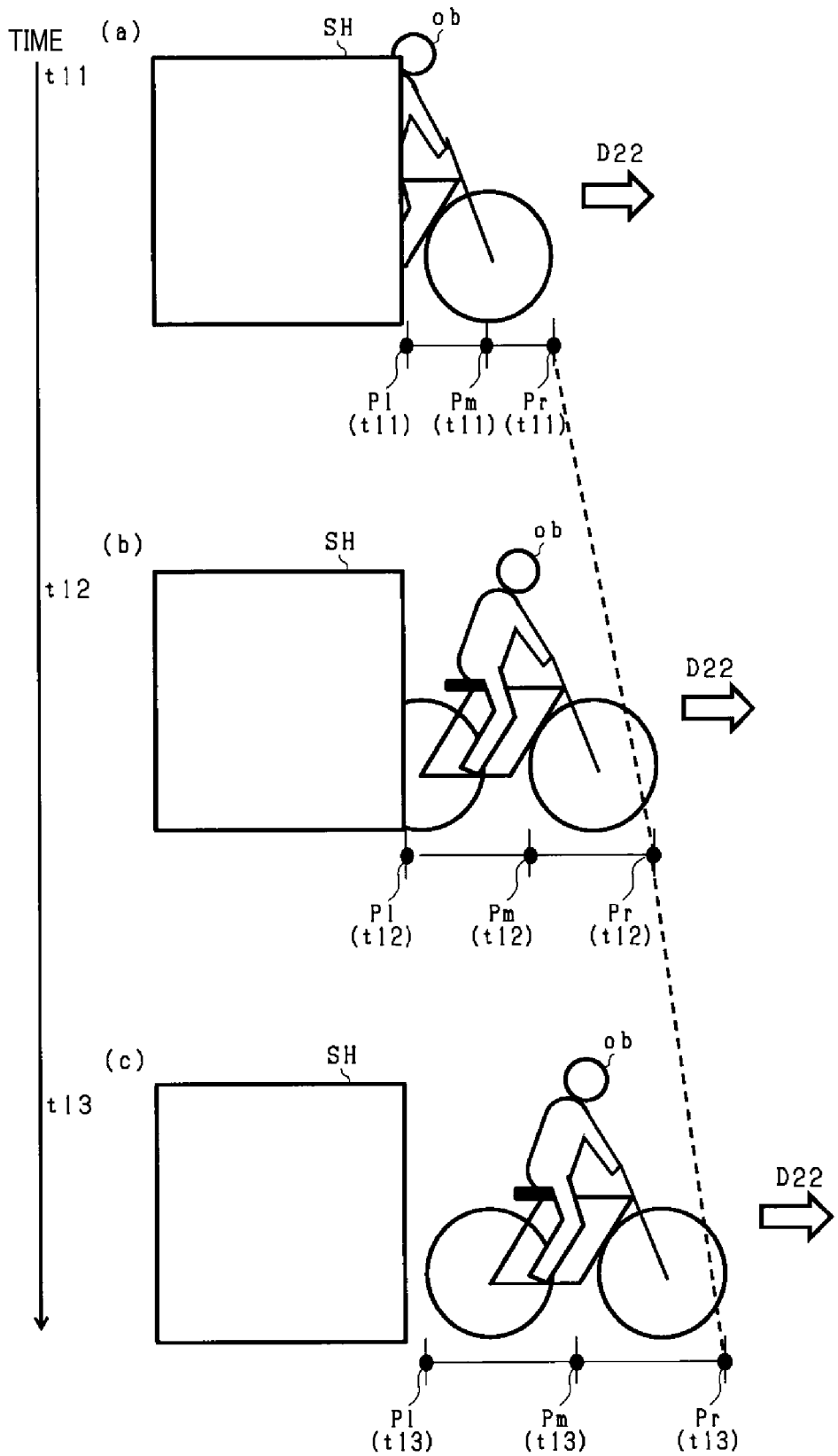
FIG. 6 is a diagram showing an example of a case where a movement track of a target Ob is calculated by a movement track calculation process shown in FIG. 3.

FIG. 6 is a diagram showing an example of a case where the movement track of the target Ob is calculated by the movement track calculation process shown in FIG. 3. In FIG. 6, it is assumed that the target Ob is partially hidden behind an obstacle SH and is moving in the own vehicle lateral direction D22.

As shown in FIG. 6(a), at time t11, the left side (in the figure) of the target Ob is still hidden behind the obstacle SH. Therefore, the left end position Pl of the lateral position information LI output from the camera sensor 31 is detected to be located more to the right compared with the actual left end of the target Ob.

As shown in FIG. 6(b), also at the time t12, the left end (in the figure) of the target Ob is still hidden by the obstacle SH, and the movement amount per unit time of the left end position Pl has not changed. On the other hand, the right end position Pr changes its position along according to the movement of the target Ob. Therefore, at times t11 and t12, the right end position Pr of the two end positions Pl and Pr is determined as the movement end point.

As shown in FIG. 6(c), at time t13, when the target Ob has completely come out from the obstacle SH, the actual left end of the target Ob is detected as the left end position Pl of the target Ob. Since the amounts of movement per unit time of the two end positions Pl and Pr are equal to or greater than the threshold, at time t13, the calculation of the movement track is started using all of the lateral position information LI (Pl(t13), Pm(t13), Pr(t13)).

In the example shown in FIG. 6, in the time period from time t11 to time t12, only the right end position Pr of the lateral position information LI of the target Ob which has been properly acquired is used to calculate the movement track. At time t13, once each of the positions of the lateral position information LI is properly acquired, the calculation of the movement track using all of the lateral position information LI (Pl, Pm, Pr) is started. In other words, when a position that has not been properly acquired is included in the lateral position information LI of the target Ob, the movement track is calculated based on the appropriately acquired right end position Pr. Therefore, when the ECU 20 determines the position of the target Ob based on the movement track of the target Ob, the position of the target Ob can be determined based on the movement track with a reduced error. As a result, the operation accuracy of the brake unit 25 by the ECU 20 can be improved.

As described above, when the target Ob is hidden behind an obstacle and the positions of the two ends are not properly acquired, the ECU 20 according to the first embodiment can calculate the movement track based on the position closer to the own vehicle CS that has been properly acquired (for example, the right end position Pr in FIG. 6). Therefore, when the ECU 20 determines the position of the target Ob based on the movement track of the target Ob, the position of the target Ob can be determined based on the movement track with a reduced error. As a result, the operation accuracy of the brake unit 25 by the ECU 20 can be improved.

Further, the ECU 20 determines whether or not a fixed end point and a movement end point are acquired as the two end positions Pl and Pr included in the lateral position information LI of the target Ob. When it is determined that a fixed end point and a moving end point are obtained as the two end positions Pl and Pr, the movement track of the target Ob in the own vehicle lateral direction D2 is calculated based on the moving end point. As a result, it is possible to reduce the error in the movement track of the object Ob caused by the two end positions Pl, Pr of the target Ob not being properly acquired.

Second Embodiment

This embodiment may be such that, on condition that the lateral position information LI is not properly acquired and the moving end point is moving toward the course of the own vehicle CS, the movement track is calculated using this moving end point.

Figure 7:
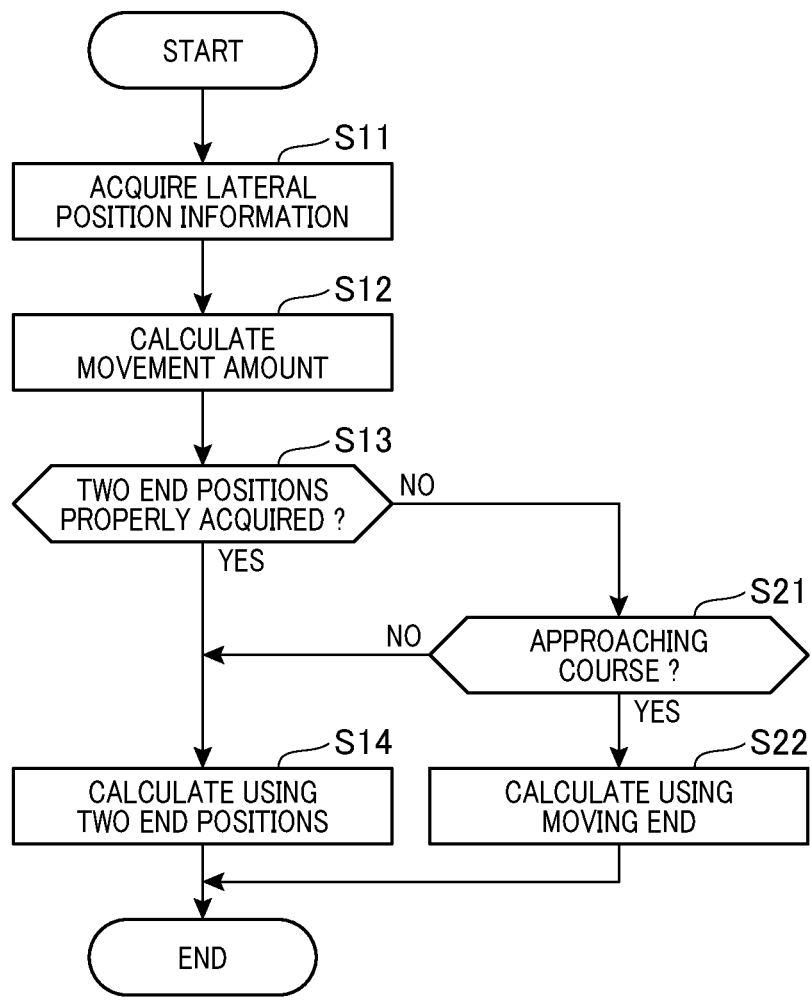
FIG. 7 is a flowchart illustrating a movement track calculation process performed by an ECU according to a second embodiment.

FIG. 7 is a flowchart illustrating a movement track calculation process performed by the ECU 20 according to the second embodiment. The process shown in FIG. 7 is repeatedly performed by the ECU 20 at a predetermined cycle. It is assumed that, in FIG. 7, a target Ob has been recognized in the captured image by the camera sensor 31.

In step S11, the lateral position information LI of the target Ob is acquired. In step S12, the movement amounts per unit time of the two end positions Pl and Pr are calculated. In step S13, it is determined whether or not the two end positions Pl and Pr are properly acquired.

When the two end positions Pl and Pr include only movement end points and the lateral position information LI has been properly acquired (step S13: YES), in step S14, all of the lateral position information LI is used to calculate the movement track of the target Ob.

On the other hand, when the two end positions Pl and Pr include a movement end point and a fixed end point, and the lateral position information LI is not properly acquired (step S13: NO), in step S21, it is determined whether the moving end point is moving toward the course of the own vehicle CS or away from the course of the own vehicle CS. The determination in step S21 is made using the temporal change in the moving end point included in the lateral position information LI. Step S21 serves as a movement direction determination unit.

FIG. 8 is a diagram for describing the determination process in step S21. In the example shown in FIG. 8, it is assumed that the target Ob is located ahead of the vehicle CS and part of it is located outside the angle of view of the camera sensor 31.

In FIG. 8(a), since the left side (in the figure) of the target Ob is outside the angle of view of the camera sensor 31, the left end position Pl is the fixed end point and the right end position Pr is the moving end point. Further, the movement direction of the target Ob is the own vehicle lateral direction D22, and it is moving toward the course of the own vehicle CS. Since, in the own vehicle lateral direction D2, the position of the moving end point (Pr) within the target Ob coincides with the movement direction of the target Ob, the movement direction of the moving end point is toward the course of the own vehicle CS at the target Ob.

Similarly in FIG. 8(b), since the left side (in the figure) of the target Ob3 is outside the angle of view of the camera sensor 31, the left end position Pl is the fixed end point and the right end position Pr is the moving end point. The movement direction of the target Ob is D21 (left in the figure), and it is moving away from the course of the own vehicle CS. Since, in the own vehicle lateral direction D2, the position of the moving end point (Pr) within the target Ob differs from the movement direction of the target Ob, the movement direction of the moving end point is away from the course of the own vehicle CS at the target Ob.

Returning to FIG. 7, when the movement direction of the moving end point is a direction toward the traveling direction of the own vehicle CS (step S21: YES), in step S22, the movement track of the target Ob is calculated using only the moving end point. In this case, the ECU 20 decides that the target Ob is moving toward the own vehicle CS and the risk of danger to the vehicle CS is high, and calculates the movement track using only the point of the two end positions Pl, Pr that is properly acquired.

On the other hand, when the movement direction of the moving end point is a direction away from the traveling direction of the own vehicle CS (step S21: NO), in step S14, the movement track of the target Ob is calculated using all of the lateral position information LI. In this case, the ECU 20 decides that the target Ob is moving away from the own vehicle CS and the risk of danger to the vehicle CS is low, and calculates the movement track using all of the lateral position information LI.

As described above, in the ECU 20 according to the second embodiment, when it is determined that both the moving end point and the fixed end point are acquired, and the moving end point is located on the determined movement direction side of the target Ob, the movement track of the target Ob in the own vehicle lateral direction D2 is calculated based on the moving end point.

Since the movement track of the fixed end point side will not be calculated in the case where the movement track is calculated using only the moving end point of the target Ob, it is preferable that it is executed in a limited manner. Therefore, since the risk of danger to the own vehicle caused by the target Ob becomes higher when the movement direction of the moving end point is toward the course of the own vehicle CS, only in such cases, the movement track of the target Ob is calculated using the moving end point, so that the calculation of the movement track using only the moving end point is limited only in cases where the risk of danger to the own vehicle CS is high.

Third Embodiment

Figure 9:
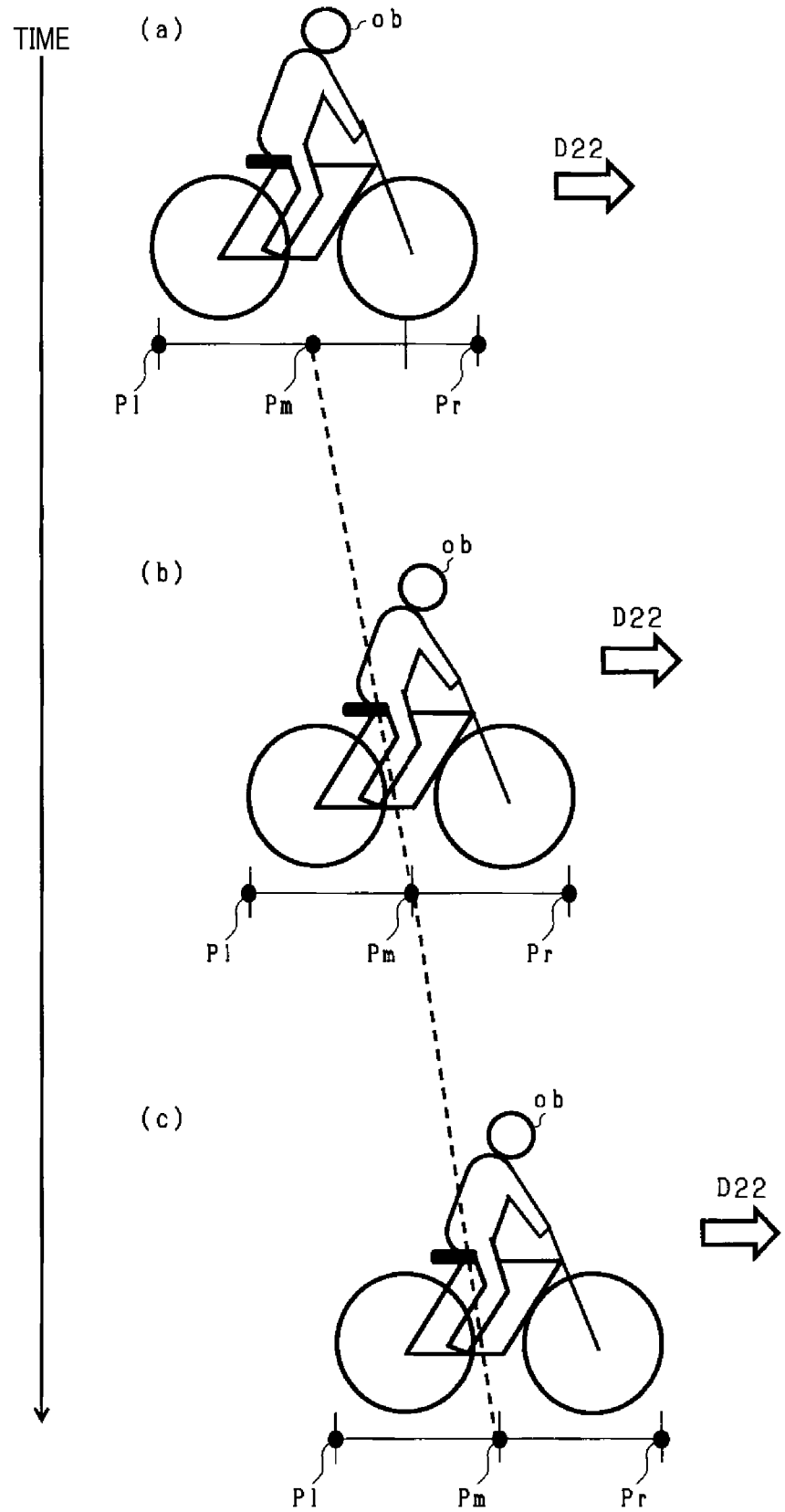
FIG. 9 is a timing diagram illustrating a movement track calculation process according to the third embodiment.

This embodiment may be such that when the lateral position information LI is appropriately acquired, the movement track is calculated using only the center position Pm of the target Ob. FIG. 9 is a timing diagram illustrating calculation of a movement track according to the third embodiment. The process shown in FIG. 9 is a process performed in step S14 of FIG. 3 and step S14 of FIG. 7.

In FIG. 9, the two end positions Pl and Pr of the target Ob are both acquired as moving end points. Therefore, at times t21 to t23, the movement track is calculated based on the center position Pm of the target Ob.

As described above, in the third embodiment, the ECU 20 (acquisition unit) acquires the center position Pm of the target Ob in the own vehicle lateral direction D2, and when both the end positions Pl and Pr are acquired as moving end points, it calculates the movement track of the object in the own vehicle lateral direction D2 based on the center position Pm.

The center position of the target Ob has less variation compared with the two end positions Pl and Pr, and the accuracy of the position is higher. Thus, when it is determined that the two end positions Pl and Pr have been properly obtained, the movement track of the target Ob in the lateral direction is calculated based on the center position. As a result, it is possible to improve the accuracy of the movement track of the target Ob.

Fourth Embodiment

This embodiment may be configured such that a shift from a state where the lateral position information LI is not properly acquired to a state where it is properly acquired is detected based on the difference in the movement speed of each position.

FIG. 10 is a flowchart illustrating a process according to the fourth embodiment. For example, the flowchart shown in FIG. 10 is executed at a predetermined cycle by the ECU 20, on condition that the calculation of the movement track using the moving end point has been performed in step S15 of FIG. 3.

In step S31, it is determined whether the lateral position information LI has been acquired or has not been properly acquired. If the result is negative in step S31 (step S31: NO), the process shown in FIG. 10 halts.

On the other hand, if the result is affirmative (step S31: YES), the speed of the moving end point is calculated in step S32. The speed of the moving end point is calculated based on the temporal change in the movement amount of the position determined as the moving end point. For example, every time the process of step S33 is performed, the ECU 20 stores the lateral position information LI, and calculates the respective differences with respect to the fixed end position stored this time and the fixed end point stored last time as the temporal change of the lateral position information LI.

In step S33, the speed of the fixed end point is calculated. The speed of the fixed end point is calculated based on the temporal change in the movement amount of the position determined as the fixed end point.

In step S34, it is determined whether the difference between the speed of the moving end point calculated in step S32 and the speed of the fixed end point calculated in step S33 is equal to or less than the threshold or exceeds the threshold. Since the threshold used in step S34 is for distinguishing the state in which the fixed end point has changed to the moving end point, the value of the threshold is varied in accordance with the speed of the moving end point calculated in step S32.

If the speed difference is equal to or less than the threshold (step S34: YES), in step S35, the calculation of the movement track based on the two end positions is started. In this case, the fixed end point has changed to the moving end point, and thus the two end positions are properly acquired and the speed difference of the two end positions is decreased. For example, the movement track of the target Ob is calculated using all of the lateral position information LI (Pl, Pm, Pr).

On the other hand, if the speed difference exceeds the threshold (step S34: NO), the process shown in FIG. 10 halts. In this case, since the two end positions include a fixed end point and a moving end point, they are not properly acquired, and the speed difference of the two end positions still maintains a certain value. Thus, the movement track of the target Ob is calculated using only the moving end point of the lateral position information LI.

As described above, in the fourth embodiment, when a moving end point and a fixed end point have been acquired and the movement track has been calculated based on the moving end point, and then the difference between the movement speed of the position corresponding to the moving end point and the movement speed of the position corresponding to the fixed end point becomes equal to or less than a certain value, the ECU 20 shifts to the calculation of the movement track based on the center position of the target Ob. In a situation where the difference between the moving speed of the position corresponding to the moving end point and the moving speed of the position corresponding to the fixed end point becomes equal to or smaller than a certain value, it can be considered that it has shifted from a state in which only a part of the object is imaged in the lateral direction of the captured image to a state in which the entire object is imaged. In such case, by switching from the calculation of the movement track using only the moving end point to the calculation of the movement track using the center and two end positions, for example, it is possible to properly detect the movement track of an object that comes out from behind a wall or another vehicle and crosses the course ahead of the own vehicle. This makes it possible to appropriately implement collision avoidance control with regard to the object.

Other Embodiments

The recognition of the target Ob may be performed by the ECU 20. In this case, the ECU 20 functionally includes the object recognition unit 34 and the position information calculation unit 35 shown in FIG. 1. Further, the ECU 20 may be installed in the camera sensor 31.

Furthermore, the driving support apparatus 10 may recognize the target Ob based on the detection result of the target Ob by the camera sensor 31 and the detection result of the target Ob by the radar sensor 40.

The threshold used for judging the lateral position information LI in step S13 of FIG. 3 or FIG. 7 may be changed according to the type of the object Ob. For example, since the moving speed is different from a case where the type of object Ob is a pedestrian to a case where it is a vehicle, there is a great difference in the movement amount per unit time. Therefore, when the target Ob is recognized as a pedestrian, the threshold for judging the amount of movement per unit time is decreased, and when the target Ob is recognized as a vehicle, the threshold for judging the amount of movement per unit time is increased. With the above-described configuration, it is possible to perform an appropriate judgment of the two end positions Pl, Pr depending on the target Ob, and the calculation accuracy of the movement track of the target Ob can be improved.

Although the present disclosure is described based on examples, it should be understood that the present disclosure is not limited to the examples and structures. The present disclosure includes various modifications and variations within the scope of equivalence. Furthermore, various combination and forms, in addition to other combinations and forms, which further include only one element or fewer or more elements, are also included in the scope and the spirit of the present disclosure.

The invention claimed is:

1. A movement track detection apparatus comprising:
an acquisition unit configured to acquire two end positions of an object in a lateral direction of an own vehicle in a captured image by an image capturing unit;
a calculation unit configured to calculate a movement track of the object in the lateral direction of the own vehicle based on at least a center position of the two end positions acquired in the lateral direction of the own vehicle; and
a determination unit configured to determine whether or not the acquisition unit has acquired, as the two end positions, both a moving end point whose position changes in the captured image and a fixed end point whose position does not change in the captured image, wherein
the calculation unit calculates the movement track based on the moving end point when it is determined that the acquisition unit has acquired the moving end point and the fixed end point.

2. The movement track detection apparatus according to claim 1, further comprising a movement direction determination unit configured to determine whether or not the moving end point is moving toward a course of the own vehicle, wherein
the calculation unit calculates the movement track based on the moving end point when it is determined that the acquisition unit has acquired both the moving end point and the fixed end point, and the moving end point is moving toward the course of the own vehicle.

3. The movement track detection apparatus according to claim 1, wherein, in a state where it is determined that the acquisition unit has acquired both the moving end point and the fixed end point, and the movement track is calculated based on the moving end point, when a difference between a movement speed of a position corresponding to the moving end point and a movement speed of a position corresponding to the fixed end point becomes equal to or less than a certain value, the calculation unit shifts to calculation of the movement track based on the center position of the object.

4. A movement track detection method comprising:
an acquisition step of acquiring two end positions of an object in a lateral direction of an own vehicle in a captured image obtained by an image capturing unit;
a calculation step of calculating a movement track of the object in the lateral direction of the own vehicle based on a center position of the two end positions acquired in the lateral direction of the own vehicle; and
a determination step of determining whether or not the acquisition step has acquired, as the two end positions, both a moving end point whose position changes in the captured image and a fixed end point whose position does not change in the captured image, wherein
the calculation step calculates the movement track based on the moving end point when it is determined that the acquisition step has acquired the moving end point and the fixed end point.

* * * * *